May 17, 1949.　　　　V. F. PARRY　　　　2,470,106
PROCESS FOR REDUCING IRON ORES
Original Filed April 20, 1945
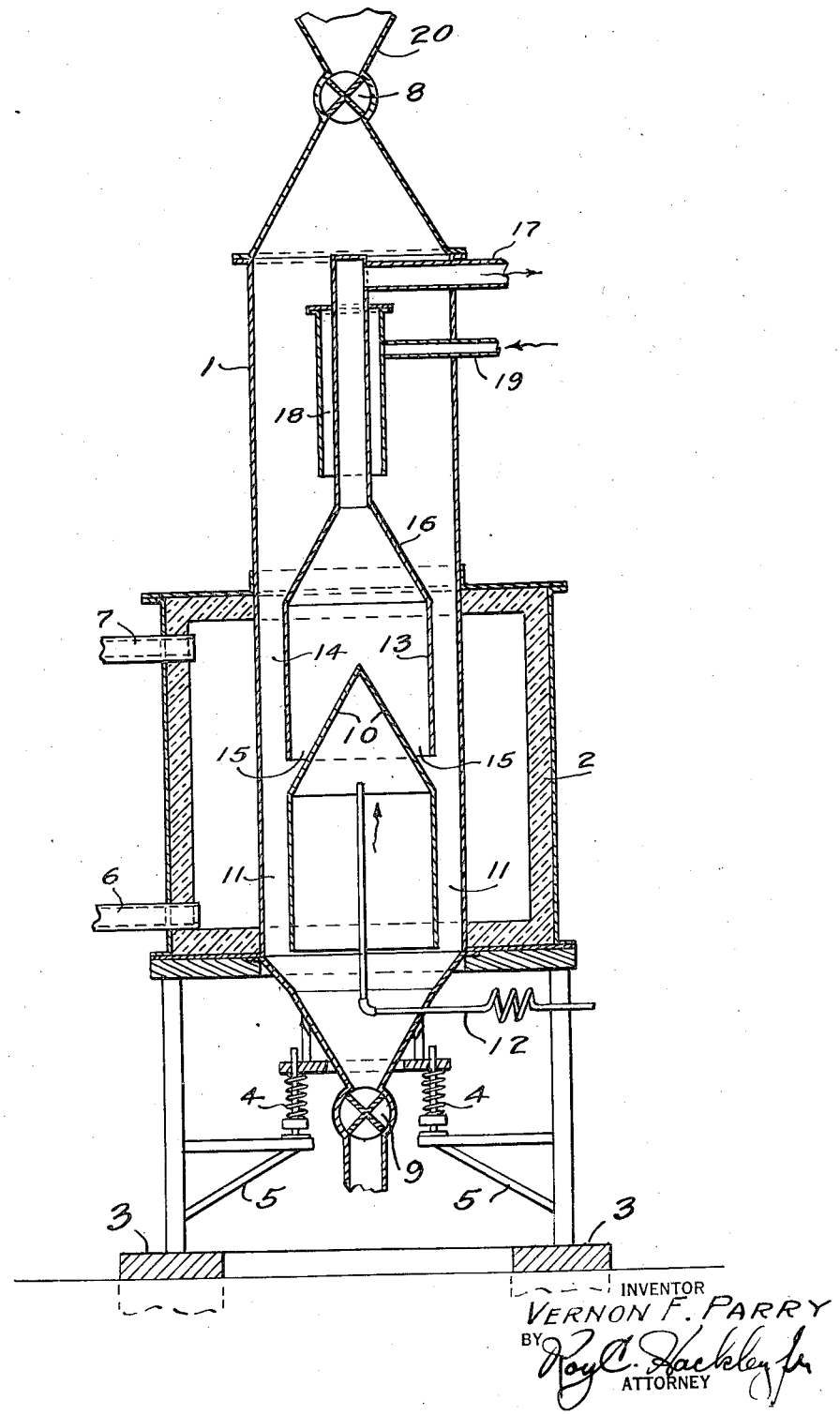
INVENTOR
VERNON F. PARRY
BY
ATTORNEY Patented May 17, 1949

2,470,106

UNITED STATES PATENT OFFICE 2,470,106

PROCESS FOR REDUCING IRON ORES

Vernon F. Parry, Golden, Colo.

Original application April 20, 1945, Serial No. 589,450. Divided and this application October 7, 1946, Serial No. 701,634

1 Claim. (Cl. 75—34)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to chemical reaction methods, and, more particularly, to suitable methods for carrying out endothermic chemical reactions involving solid and gaseous materials, such as the gasification of lignite with concomitant reduction of iron ore.

Accordingly, this invention has for its object the provision of a method for the reduction of iron ores with concomitant gasification of non-coking solid carbonaceous materials wherein high heat economies are achieved in a continuous manner.

In accordance with this invention, a non-coking solid carbonaceous material, such as lignite, is gasified and iron ore is reduced by an endothermic chemical process which comprises stage heating a mixture of iron ore, suitably sintered or briquetted and a non-coking solid carbonaceous material having gas-forming constituents, along a vertically-ranging course sealed from the atmosphere through which is passes by gravity; by first feeding the mixture downwardly into an annular preheating zone of relatively large superficial area in said course while directing heated gases centrally upward through said annular zone in heat-transfer and physically separated relation to descending solids, next directing the descending solids into a second annular heating zone of lesser superficial area than the first said zone, subjecting the solids in said second zone to the heat transfer action of heated gases contacting the central and external bounds of said zone and heat-transfer action by conduction of heat through the outer boundary of the said second annular heating zone such that the temperature of the mixed solids and reactants is raised to the range of 1800° to 2150° F., causing evolved gases to travel concurrently with said solids throughout substantially the vertical extent of said second zone, passing said evolved gases into said central area at the bottom of said second zone to permit their ascent in heat transfer relation to the descending material, then directing the descending solids into a third annular heat-transfer zone and then causing relatively cool carrier gases to pass through descending solids in said third zone in a direction countercurrent to the solids movement therein to extract heat units and evolved gases therefrom.

The drawing shows a diagrammatic arrangement of apparatus for carrying out this invention wherein the ore and the lignite or the like are in admixture; and An elongated reaction vessel 1 is vertically positioned in a combustion chamber 2, the whole being suitably supported by a base 3. Compression springs 4 transfer the weight of the vessel 1 through angles 5 to the base 3 while permitting temperature-induced dimensional changes in the vessel 1.

The combustion chamber 2 surrounds the vessel 1 for the major portion of its length, and said chamber 2 is provided with an inlet 6 for air and fuel and an outelt 7 for flue gases. The reaction vessel 1 is provided with valves 8, 9 at its upper and lower ends for admitting and discharging solids while maintaining a gas-tight seal.

Inside the vessel 1 near its lower end is positioned a hollow, cylindrical member 10, closed at its upper end and open at its lower end. The member 10 is spaced apart from the inner wall of vessel 1 to define an annular reaction zone 11. A pipe 12 passes through the lower part of the vessel 1 into the upper part of the member 10 to cause steam or other introduced gases to fill the member 10 and escape into zone 11.

Above the cylindrical member 10 in the vessel 1 is provided a second hollow cylindrical member 13 spaced apart from the vessel 1 to define an upper annular reaction zone 14. The second member 13 is spaced apart from the lower member to provide a throat 15 for egress of gases and vapors from the reaction zones 14 and 15. The top 16 of member 13 is provided with a pipe 17 to remove evolved gases from the member 13. The pipe 17 is vertically positioned in the upper portion of the vessel 1 and then passes out of the vessel 1. A portion of the pipe 17 is surrounded by a jacket 18 open at the bottom and closed at the top, into which steam is admitted through an inlet pipe 19.

In carrying out the provisions of this invention, lignite or other solid non-coking carbonaceous material, together with iron ore, preferably briquetted into small pellets, is charged into a hopper 20 at the upper end of the reaction vessel 1 and thence through the feed valve 8 into the upper portion of the vertically ranging reaction vessel 1. As will be seen, this portion of the vessel 1 forms an annular reaction zone of relatively large superficial area and the mixture of lignite or the like and oxidized iron ore is there preheated by heat exchange with the gases leaving pipe 17 and carried to the upper member 13.

Additional heat and water is supplied in the form of steam entering the pipe 19 and passing into the preheating zone through the jacket 18. Thereupon the mixture of lignite or the like and iron ore passes downwardly by gravity into a second annular heat zone 14 defined by the vessel 1 and the upper central member 13. In this heating zone, combustion gases formed by burning fuel in the combustion chamber 2 sweep around the vessel 1 and heat the mixture in the reaction zone 14 to a temperature in the range of about 1800° to 2150° F. The lignite is first distilled in the zone 14 and then reacts with the steam concurrently traveling downwardly in the presence of the iron oxide to form a mixture of hydrogen and carbon monoxide which in turn acts to reduce the iron oxide content of the ore. Fuel is burned in the combustion chamber 2 surrounding the vessel 1 by admitting a mixture of fuel and air through the inlet 6 where it passes around the vessel 1 and emerges as flue gases from the outlet 7. In passing down through the annular reaction zone 14 the gases and solids travel concurrently and the gases emerge through the throat 15 and pass upwardly into the inner portion of the upper member 13 in heat exchange relationship with descending solids and gases of the annular reaction zone 14. The evolved gases and vapors then pass upwardly through the pipe 17 and out through the preheating zone to be vented from the apparatus.

After leaving the throat 15 defined by the upper member 13 and the lower member 10 positioned in the vessel 1, the solids, including lignite or the like not yet completely gasified, and the partially reduced iron oxides, then pass downwardly into the annular reaction zone 11 at a temperature between 1800° and 2150° F. The temperature is regulated in part by controlling the combustion in the chamber 2 and in part by adjusting the rate at which solid reactants are fed and discharged through the valves 8 and 9, as well as in part by the admission of steam into the preheating zone through the pipe 19. Additional control is secured by introduction of steam and other gases as desired through the pipe 12 into the upper portion of the lower member 10.

In traversing the reaction zone 11 in the lower portion of the vessel 1, evolved gases, steam and carrier gases pass in countercurrent stream to the descending solids. Conditions are adapted in zone 11 in accordance with the well-known water-gas reactions to achieve as complete a gasification as possible of the carbonaceous constituents without at the same time reoxidizing the iron ore being reduced. It is to be observed that steam or carrier gases entering the inner portion of the lower member 10 through the pipe 12 first pass upwardly through the pipe 12 and then downwardly in heat exchange relationship with the materials in the surrounding reaction zone 11 and thence upwardly through the reaction zone 11. By this means, temperature control is greatly facilitated, while the solid materials leaving the vessel through the valve 9 have been deprived of most of their usable heat.

After removal of the solid materials from the vessel through the valve 9, sponge or metallic iron is separated from the discharged solids by magnetic means.

As an example of the operation of the process for direct reduction of iron ore with simultaneous production of high heating value oxygenated water gas from admixed raw lignite, the following experimental data obtained from a test in a pilot plant of the same design as that shown in the drawing are cited:

In this test, oxidized magnetic iron ore, briquetted into small pellets, was mixed with raw lignite in ratio of 1:1 and charged into the upper reaction zone 14, wherein the mixture was heated progressively to about 1800° F. before passing into the lower reaction zone 11 wherein it was further heated in about the same temperature range while in contact with water gas generated in the reaction zone by reactants passing countercurrent to the descending solids. The reduced mixture consisting of metallic iron and fine high-ash lignite dust was discharged at the bottom while high heating value gas formed by reactions between lignite, steam and oxygen from the iron ore, within reaction zones 14 and 11, was removed from the system through heat exchange zones within the upper member 13 and the pipe 17. The following operating data were recorded:

Rate of feed of lignite,
    pounds per hour, about__ 25
Rate of feed of iron ore,
    pounds per hour, about__ 25
Rate of steam input to upper reaction zone_ 0
Rate of steam input to lower reaction zone,
    lbs./hr__ 15
Gas made _____ cubic feet per hour__ 444
Analysis of gas:
    Carbon dioxide _____ percent__ 1.4
    Carbon monoxide_____ do____ 40.9
    Hydrogen _____ do____ 55.6
    Methane _____ do____ 2.1
    Specific gravity_____ .430
    Heating value, B. t. u. per cubic foot___ 327
Temperature, bottom of combustion chamber _____°F__ 1895
Temperature, middle of combustion chamber _____°F__ 1855
Temperature, top of combustion chamber
    °F__ 1620
Temperature, outlet of furnace_____ do__ 1410
Temperature, out of recuperator_____ do__ 845
Temperature, gases leaving retort_____ do__ 515
Temperature, solids leaving bottom of retort
    °F__ 500

The sponge or metallic iron yielded was tested and found to be substantially completely reduced metallic iron.

This application is a division of my application, Serial No. 589,450, filed April 20, 1945.

Since many apparently widely differing embodiments of the invention will occur to one skilled in the art, various changes may be made in the method and means described and shown, without departing from the spirit and scope of this invention.

What is claimed is:

The endothermic chemical reaction process, which comprises stage heating a mixture of iron ore suitably sintered or briquetted and a non-caking solid carbonaceous material having gas forming and liquefiable constituents, along a vertically-ranging course sealed from the atmosphere through which it passes by gravity: by first feeding the mixture downwardly into an annular preheating zone of relatively large superficial area in said course while directing heated gases centrally upward through said annular zone in heat-transfer and physically separated relation to descending solids, next directing the descending solids into a second annular heating zone of lesser superficial area than the first said zone, subjecting the solids in said second zone to the heat-transfer action of heated gases contacting the central and the outer boundary of the said second annular heating zone such that the temperature of the mixed solids and reactants is raised to the range of 1800° to 2150° F., causing evolved gases to travel concurrently with said solids throughout substantially the vertical extent of said second zone, passing said evolved gases into said central area at the bottom of said second zone to permit their ascent in heat-transfer relation to the descending material, then directing the descending solids into a third annular heat-transfer zone and then causing relatively cool carrier gases to pass through descending solids in said third zone in a direction countercurrent to the solids movement therein to extract heat units and evolved gases therefrom.

VERNON F. PARRY.

REFERENCES CITED

The following references are of record in the file of this patent:

UNITED STATES PATENTS

| Number | Name | Date |
|---|---|---|
| 1,557,107 | Trent | Oct. 13, 1925 |